US007321769B2

(12) United States Patent
Bhide

(10) Patent No.: US 7,321,769 B2
(45) Date of Patent: Jan. 22, 2008

(54) METHOD AND APPARATUS FOR MANAGING PERSONAL CACHE IN A WIRELESS NETWORK

(75) Inventor: Sandhiprakash J. Bhide, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 437 days.

(21) Appl. No.: 10/121,804

(22) Filed: Apr. 12, 2002

(65) Prior Publication Data

US 2003/0194998 A1  Oct. 16, 2003

(51) Int. Cl.
*H04Q 7/00* (2006.01)
*H04L 12/58* (2006.01)
*H04J 3/24* (2006.01)

(52) U.S. Cl. .................... 455/433; 455/412.1; 370/349

(58) Field of Classification Search ............... 455/433, 455/445, 466, 514, 412.1, 185.1, 550, 557, 455/3.05, 419, 41.2, 418, 406, 414.1; 711/1, 711/117, 168, 129; 715/530; 725/114, 62; 375/222; 709/238; 370/349
See application file for complete search history.

(56) References Cited

U.S. PATENT DOCUMENTS

| | | | | | |
|---|---|---|---|---|---|
| 5,933,775 | A | * | 8/1999 | Peters | 455/420 |
| 5,960,452 | A | * | 9/1999 | Chi | 711/117 |
| 5,974,085 | A | * | 10/1999 | Smith | 375/222 |
| 6,032,227 | A | * | 2/2000 | Shaheen et al. | 711/129 |
| 6,108,534 | A | * | 8/2000 | Bourgeois et al. | 455/419 |
| 6,151,507 | A | * | 11/2000 | Laiho et al. | 455/466 |
| 6,151,610 | A | * | 11/2000 | Senn et al. | 715/516 |
| 6,157,935 | A | * | 12/2000 | Tran et al. | 715/503 |
| 6,167,496 | A | * | 12/2000 | Fechner | 711/168 |
| 6,289,212 | B1 | * | 9/2001 | Stein et al. | 455/412.1 |
| 6,311,058 | B1 | * | 10/2001 | Wecker et al. | 455/418 |
| 6,473,609 | B1 | * | 10/2002 | Schwartz et al. | 455/406 |
| 6,557,015 | B1 | * | 4/2003 | Bates et al. | 715/501.1 |
| 6,594,484 | B1 | * | 7/2003 | Hitchings, Jr. | 455/414.1 |
| 6,611,870 | B1 | * | 8/2003 | Asano et al. | 709/238 |
| 6,636,733 | B1 | * | 10/2003 | Helferich | 455/412.2 |
| 6,735,186 | B1 | * | 5/2004 | Leppinen | 370/338 |

(Continued)

OTHER PUBLICATIONS

Global System for Mobile Communications, http://www.smarthomeforum.com/gsm.shtml, Apr. 4, 2001, 3 pages.

(Continued)

*Primary Examiner*—Joseph Feild
*Assistant Examiner*—Kiet Doan
(74) *Attorney, Agent, or Firm*—Blakely, Sokoloff, Taylor & Zafman LLP

(57) ABSTRACT

A method and apparatus for determining whether cache memory is available on a wireless network to store at least one user-selected electronic file. The cache memory may be provided to a user of a wireless device for a fee. If a user has cache memory available on the wireless network the user may store in the cache memory one or more electronic files. The wireless network senses the location of the user and sends a copy of the at least one user-selected electronic file to the user's wireless device. As the user moves from one switching center to another, a set of rules may be executed to retrieve location, time or context specific information as specified by the user.

18 Claims, 5 Drawing Sheets

U.S. PATENT DOCUMENTS

| | | |
|---|---|---|
| 6,795,688 B1 * | 9/2004 | Plasson et al. ............. 455/41.2 |
| 6,842,876 B2 * | 1/2005 | Schilit et al. ............... 715/530 |
| 6,845,094 B1 * | 1/2005 | Zhang ....................... 370/349 |
| 2001/0005682 A1 * | 6/2001 | Terao et al. ................ 455/550 |
| 2002/0082048 A1 * | 6/2002 | Toyoshima ................ 455/557 |
| 2002/0086689 A1 * | 7/2002 | Moran et al. ............... 455/466 |
| 2002/0095543 A1 * | 7/2002 | Shioda et al. .................. 711/1 |
| 2002/0160751 A1 * | 10/2002 | Sun et al. ................... 455/412 |
| 2002/0173344 A1 * | 11/2002 | Cupps et al. ............... 455/566 |
| 2003/0014755 A1 * | 1/2003 | Williams .................... 725/62 |
| 2003/0066090 A1 * | 4/2003 | Traw et al. ................. 725/114 |
| 2003/0190887 A1 * | 10/2003 | Hook et al. ................ 455/3.05 |

OTHER PUBLICATIONS

GSM <-> IP network arcitecure, http://www.mobic.com/network/gsmnetwork.htm, Apr. 4, 2001, 6 pages.

John Scourias, "A Brief Overview of GSM," http://kbs.cs.tu-berlin.de/~jutta/gsm/js-intro.html, Apr. 4, 2001, 14 pages.

John Scourias, "Overview of Global System for Mobile Communications," GSM Data Knowledge Site, http://www.pcsdata.com/es53061/overview.html, Apr. 4, 2001, 15 pages.

* cited by examiner

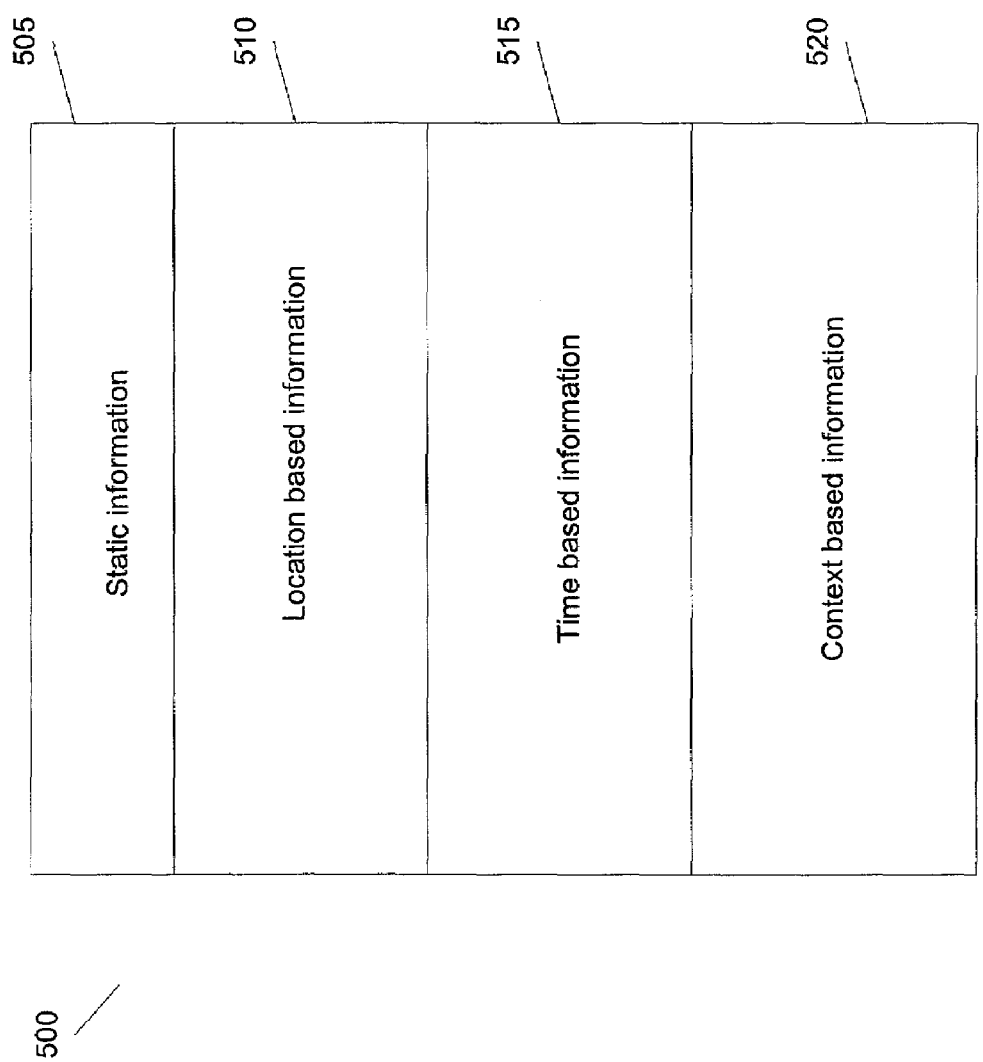

US 7,321,769 B2

METHOD AND APPARATUS FOR MANAGING PERSONAL CACHE IN A WIRELESS NETWORK

BACKGROUND OF THE INVENTION

1. Field of the Invention

The present invention is related to the field of electronic-commerce. In particular, the present invention is related to a method and apparatus for managing personal cache in a wireless network.

2. Description of the Related Art

With the advent of the Internet many Internet service providers (ISPs) provide customers with memory storage wherein the customers may store information e.g., a calendar, email, pictures, audio files etc. A customer may, via a computing device, e.g., a desk-top computer or an Internet television connected to the Internet via a phone, cable line, satellite link, or digital subscriber line (DSL) access the information in the customer's memory storage provided by the ISP. Being able to access information stored on a web site affords customers flexibility.

Cellular systems, personal communications services (PCS), paging, and wireless local area networks are gaining in popularity as alternate means of connecting to the Internet and the telephone network. The terms cellular and PCS are used to specifically refer to wireless telecommunications systems and are the type of systems referred to in the American National Standards Institute (ANSI)-41 standard. The ANSI-41 standard includes the protocol that underlies many features of wireless devices. As customers need to access more information, and in particular personalized information (especially when they are mobile), they will turn to wireless devices such as personal digital assistants and wireless lap top computers.

BRIEF SUMMARY OF THE DRAWINGS

Examples of the present invention are illustrated in the accompanying drawings. The accompanying drawings, however, do not limit the scope of the present invention. Similar references in the drawings indicate similar elements.

FIG. 5 illustrates a user's profile in personal cache according to one embodiment of the invention.

DETAILED DESCRIPTION OF THE INVENTION

Described is a method and apparatus to manage personal cache in a wireless network. Although the embodiment of the invention described herein describes personal cache being accessed over a wireless network, the personal cache may also be accessed over a wired network. In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention e.g., the interfaces at the mobile switching center (MSC) and the base station are not described but are understood by a person of ordinary skill in the art.

Parts of the description are presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical, magnetic, or optical components.

It should be understood that the programs, processes, method, etc. described herein are not related or limited to any particular computer or apparatus nor are they related or limited to any particular communication network architecture. Rather, various types of general-purpose machines, wired or wireless, may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in a nonvolatile memory such as read only memory. Lastly, repeated usage of the phrase "in one embodiment" does not necessarily refer to the same embodiment, although it may.

Figure 1:
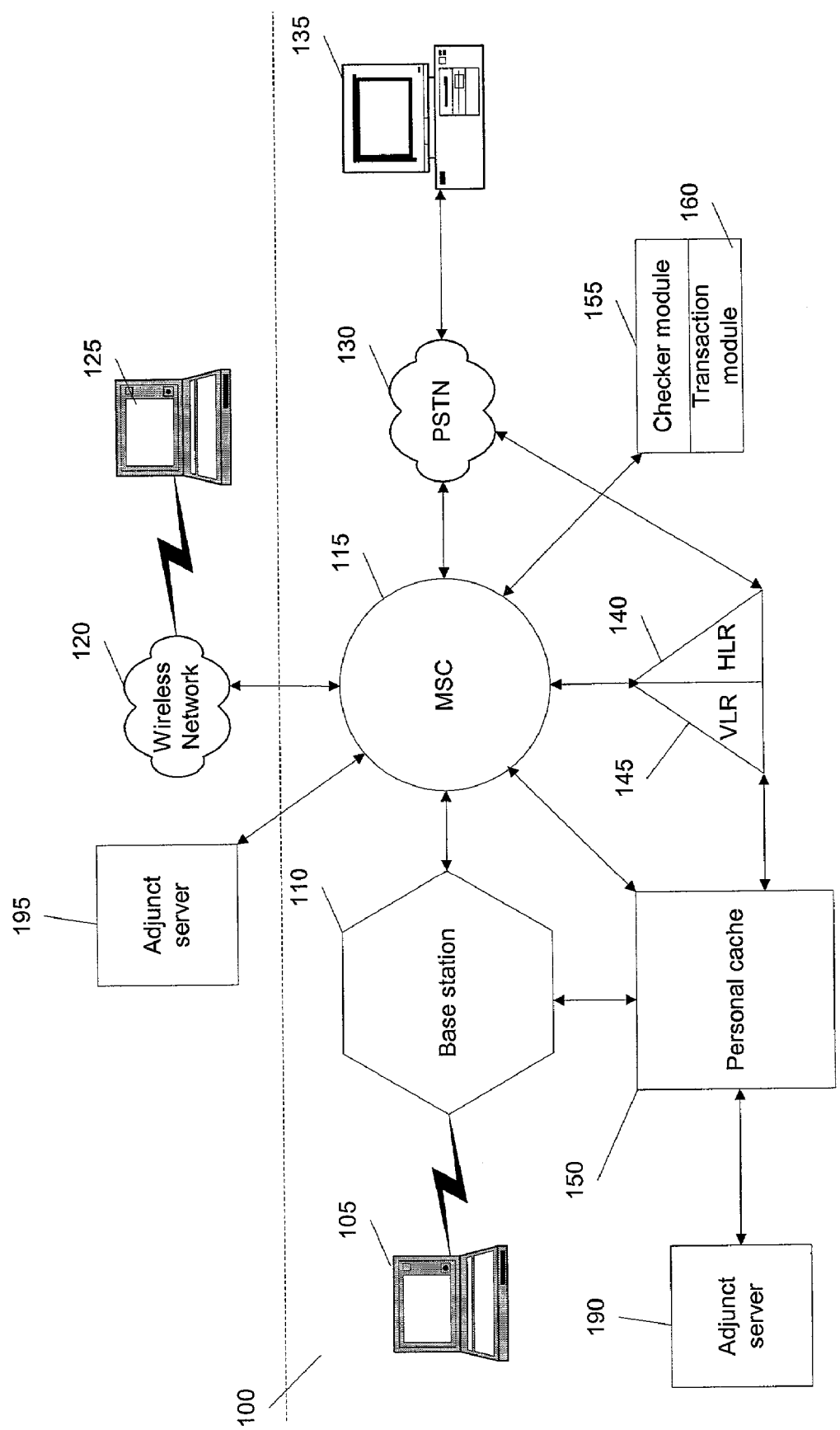
FIG. 1 illustrates a block diagram illustrating a personal cache according to one embodiment of the invention.

FIG. 1 illustrates a block diagram illustrating a personal cache according to one embodiment of the invention. As FIG. 1 illustrates, a client 135 is connected to a public switched telephone network (PSTN) 130. Although, client 135 is connected to a PSTN in FIG. 1, in other embodiments of the invention, the client 135 may be connected to the PSTN through the plain old telephone system (POTS), a DSL, a cable line, a satellite link, or other means of access. The PSTN is a functional entity that represents a network that is separate and distinct from the wireless telecommunications network. The PSTN refers to the regular wire-line telecommunications network, and is commonly accessed by ordinary telephones, key telephone systems, and private branch exchange (PBX) trunks, or through a digital subscriber loop (DSL). The PSTN 130 is connected to a mobile switching center (MSC) 115 making communications between wire-line devices and wireless devices possible. In one embodiment of the invention, a user may access a program, e.g., a configuration program that runs either locally on the user's computer 135 or on a users wireless device 135 or remotely, e.g., on adjunct servers (190 or 195) connected to personal cache 150. Adjunct servers (190, 195) are well known by a person having ordinary skill in the art of communications. In one embodiment of the invention, the adjunct server 195 may be coupled to the MSC 115. After accessing the configuration program the user may transfer selected files from the user's machine or from other web locations to a personal cache 150. In one embodiment of the invention, a user may transfer the selected files to store in personal cache 150 using either a wired connection or a wireless connection. In one embodiment of the invention, once a user has accessed the wireless network a checker module 155 interfaces with the users wireless device 105 and determines if the user has subscribed for a service permitting a user to have access to the personal cache 150. If the user has subscribed to the personal cache 150 feature, a transaction module 160 may download the information in the user's personal cache 150 based on a set of rules (described later). The information in the personal cache 150 may be sent, automatically, e.g., on a time schedule, from the personal cache on the wireless network to a user's wireless device and vice-versa. In one embodiment of the invention a wireless device may be a personal digital assistant (PDA), wireless telephones, beepers, laptop computers, etc. In one embodiment of the invention, the information in the personal cache 150 may be sent based on a user's actions, e.g., a command instruction by the user to transfer information in the personal cache 150 immediately to some destination or web site. In other embodiments of the invention the information in the personal cache may be sent to a destination based upon a set of rules in a user defined profile. In one embodiment of the invention, the information may be sent to the user's wireless device 105 using the wireless control channel, or a general packet radio service (GPRS) network. If the GPRS network is used equivalent components such as a radio network controller (RNC), a serving GPRS support node (SGSN) and a gateway GPRS support node (GGSN) may be used to transfer information to and from the personal cache 150. Thus, a personal cache 150 may be any type of storage medium (e.g., digital storage medium such as random access memory, magnetic storage media such as magnetic tapes or disks, or even optical storage media such as compact disks). In one embodiment of the invention, the wireless provider provides the personal cache 150 for a fee depending, e.g., upon the amount of personal cache 150 (bytes of storage) required by the user, or upon the time spent accessing the users information in the personal cache 150, or based on the number of data bits transferred from personal cache 150, e.g., by the user. The personal cache 150 may contain any information such as audio files, text files, video files and audio-video files or programs. In one embodiment of the invention, the information that is stored in a personal cache 150 may be stored in tables, e.g., as a series of uniform resource locators (URLs). In one embodiment of the invention, the information in the personal cache 150 may be accessed by a user using a wireless device 105 that is connected (i.e., an always-on connection) to a wireless network, e.g., using the general packet radio service (GPRS). In alternate embodiments of the invention, the user may log on, e.g., using a URL and a password to the wireless adjunct servers 190 or 195 that includes the personal cache 150, or may dial a number to access the personal cache 150. In another embodiment of the invention, the user may access the information in personal cache 150 using a wireline network, via DSL, cable, satellite, or other means. For example, a user may use client 135 to access information in personal cache 150 using PSTN 130, and MSC 115.

The MSC 115 represents an automatic switching system that switches traffic between a wireless network 120 and a PSTN 130. In alternate embodiments of the invention, the MSC 115 switches traffic between one wireless network 100 and another wireless network 120. Although the connection between wireless network 120 and MSC 115 is a wireline connection, in other embodiments of the invention the link may be a wireless link e.g., a microwave link. The MSC 115 provides the basic switching functions and coordinates the establishment of calls to and from wireless subscribers. The MSC 115 is connected to one or more base stations 110. The MSC 115 may be connected to a home location register (HLR) 140 and/or a visitor location register (VLR) 145. Thus, in one embodiment of the invention, the information in a user's personal cache 150 is stored on a server e.g., adjunct server 190, that may be connected to the MSC 115 and is accessible to the user via the user's wireless device 105 connected to the wireless network 100. In one embodiment of the invention, the personal cache 150 may be connected to a Node B that is connected to a radio network controller (RNC) that is connected to a MSC 115 or to a SGSN or GGSN in a 2.5 or 3G network 100.

HLR 140 is a primary database repository of subscriber information that provides control and intelligence to wireless networks. The HLR 140 is managed by a wireless service provider and contains a record for each subscriber that includes location information, subscribed features, subscriber status, and directory numbers. The HLR 140 may serve one or more MSCs, and there may be several HLRs in a wireless network.

In one embodiment of the invention, the subscribed features of the user may include at least the amount of personal cache 150 allocated to a particular user, a listing of files in the personal cache 150, and rules that determine the retrieval, transmittal and the content of information in the personal cache 150. A checker module 155 on the wireless network 100 may check the HLR 140 to determine whether personal cache 150 is available for a user of wireless device 105 on the wireless network 100. If personal cache 150 is available, (designated by an entry in the HLR 140 indicating that a user has subscribed to the personal cache feature) the user of wireless device 105 may receive or access the information in personal cache 150. In one embodiment if the invention, the information in the personal cache 150 is generated by executing a set of rules. After executing the set of rules the generated information may be stored on personal cache 150 and a copy of the information sent, e.g., by the transaction module 160 to the wireless device 105. In one embodiment of the invention, the HLR 140 may either contain, or may be linked to, the information in the user's personal cache.

The VLR 145 is a local database repository that contains temporary records associated with individual network subscribers. The VLR is also managed by the wireless service provider and represents a visitor's database for subscribers served in a defined local area. A visitor can be a wireless subscriber that is served by one of many systems, in areas other than the system that usually serves the subscriber in the subscriber's home location, or a subscriber who is roaming, and is temporarily outside the home location served by a particular base station. The VLR 145 contains subscriber location, status, and service information derived from the HLR 140. The local network MSC 115 accesses the VLR 145 to retrieve information for the handling of calls to and from visiting subscribers. The VLR 145 may serve one or more MSCs. In one embodiment of the invention, the information in the personal cache 150, or a portion thereof, may be linked to or included in the VLR 145. Thus a user's information in personal cache 150 may follow a user from one wireless cell to another (i.e., from one switching system to another) as the user moves from one geographical area to another. The information in the personal cache 150 if comprised as part of a particular VLR 145 remains in that VLR 145 for as long as the user is in that location. When the user moves out of the area serviced by the VLR 145 the personal cache 150 for that area is copied to the VLR in the next location, and the personal cache information in the previous VLR location may be erased. In other embodiments of the invention, if the information in the personal cache 150 is stored separately on a server that is accessible to an MSC in one serving area, the information is transferred to a server in the new MSC serving area when a user moves to the new MSC serving area. In one embodiment of the invention, a software engine that runs, e.g., at the MSC, and forms part of the transaction module 160 may copy the personal cache 150 information or a portion thereof to other VLRs or servers based on a set of executable rules.

In one embodiment of the invention, the rules are executable code that perform certain functions. The rules specify what information from the personal cache 150 may reside in the HLR 140 and the information in the personal cache 150 that may reside in the VLR 145 or on servers, e.g., adjunct server 190 accessible thereto. In one embodiment of the invention, a rule may identify the information that is to be generated, and copied from the personal cache 150 in one MSC serving area to the personal cache in another MSC serving area as the user (or the wireless device) moves from one location to another. Although the embodiment of FIG. 1 illustrates a BSC 110 and a MSC 115 as separate entities, a person having ordinary skills in the art may appreciate that the BSC 110 and the MSC 115 may be combined into a single entity. When a user moves from one location to another, the wireless infrastructure senses the user's movement from a location serviced by one MSC (or one wireless cell) to a location serviced by another MSC (or another wireless cell) and may automatically copy the information in one personal cache to another personal cache in the new MSC location. In another embodiment of the invention, a rule may allow a user to specify the content (i.e., the user's files), the location, and the duration for which the files are to be moved to a personal cache in a particular MSC location. In one embodiment of the invention, the rules keep track of the information used by a user (e.g., in a period of time) and automatically copies files from the personal cache in one location, to the personal cache in another location. Thus, the user's information is at the most "one-hop" away from the user.

In one embodiment of the invention, the wireless device 105 may be pinged by the base station 110, to determine the capabilities of the user's wireless device 105. If the wireless device 105 has sufficient memory the information in the personal cache 150 is downloaded to the wireless device 105. In one embodiment of the invention, the information stored in the users personal cache 150 is encrypted, e.g., by the transaction module 160 and downloaded to the users wireless device in an encrypted form. For the purpose of encrypting the information in the users personal cache various encryption algorithms well known in the art, e.g., data encryption standard (DES), or the secure hash algorithm (SHA)-1 etc. may be used.

Figure 2:
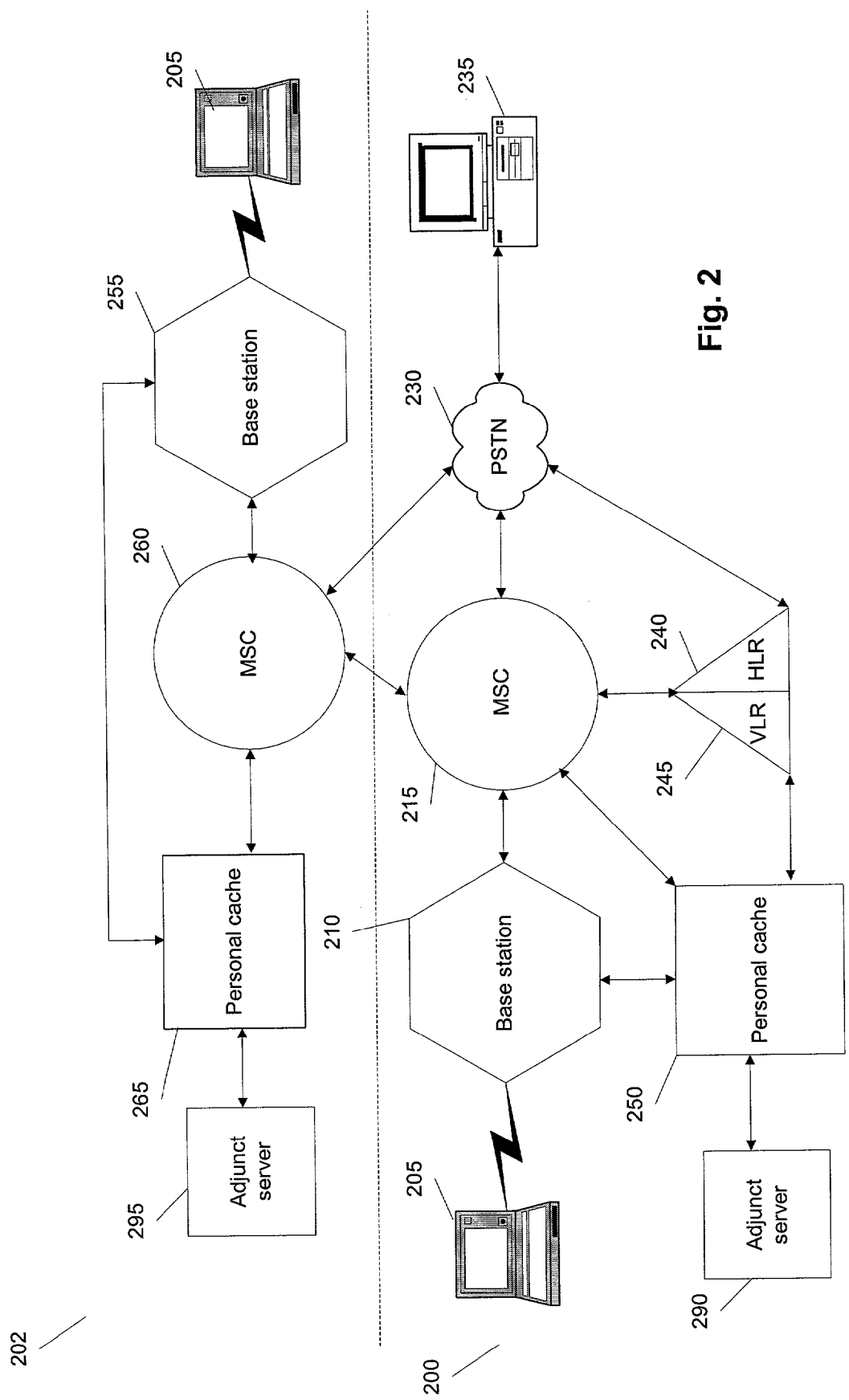
FIG. 2 illustrates a block diagram illustrating a personal cache for a mobile user in a wireless network according to one embodiment of the invention.

FIG. 2 illustrates a block diagram illustrating a personal cache for a roaming customer according to one embodiment of the invention. As illustrated in FIG. 2, a user of a wireless device 205 may save information in personal cache 250, coupled to adjunct server 290 using client 235 (e.g., a personal computer) connected to the PSTN 230 that is in communication with one or more servers that maintain and store the HLR 240, VLR 245 and personal cache 250. Alternately, the user may save information in the personal cache 250 using a wireless device 205. FIG. 2 illustrates a wireless cell 200 comprising the MSC 215 serving base station 210, and MSC 215 in communication with a second wireless cell 202 comprising MSC 260 that serves base station 255. In one embodiment of the invention, when MSC 215 serves a user or wireless device 205, the information in personal cache 250 is available to the user or the wireless device 205 via base station 210. The information in personal cache 250 may be downloaded to wireless device 205 or may be stored in personal cache 250 so that the information in personal cache 250 is at the most only one-hop away from wireless device 205. However, if the wireless device 205 moves to another wireless location, e.g., to wireless cell 202, the information in personal cache 250 is automatically copied, e.g., by the transaction module 160 to personal cache 265. Thus, the information in personal cache 250 follows a user as the user moves from one geographic location to another or from one wireless cell to another. In one embodiment of the invention, the information that is copied from the personal cache 150 is maintained in the user's profile that may be maintained in the HLR or VLR, e.g., as a table, or in the personal cache 150.

FIG. 5 illustrates a user's profile according to one embodiment of the invention. As illustrated in FIG. 5, the user's profile 500 comprises a set of rules that may be executed by transaction module 160. The user's profile 500 may comprise the user's static information 505 e.g., the user's social security number or a password that may be used by the user to access the user's personal cache 250. The user's profile 500 may also comprise rules that control location based information 510. The rules that control location based information 510 may comprise rules that when executed generate location based information. For example, a user may specify a rule that when executed generates a list of hospitals, a list of restaurants, a list of business associates or contacts etc. for a particular geographic area or a particular MSC serving area, and when the rule executes, the information may be retrieved, e.g., from one or more remote web sites or from a remote database, and the retrieved information is saved in the user's personal cache 250. When the user moves to an area serviced by another MSC the rule may be re-executed automatically, e.g., by the transaction module 160 and the information that is specific to the new geographic location is stored in the users new personal cache 265. In one embodiment of the invention, the event that triggers the re-execution of the rule is one or more handoff functions that provide the user with the capability to receive continuous service while a call is in progress without interruption. In one embodiment of the invention, a handoff function triggers the re-execution of the rule and the information is copied from the various locations, e.g., web-sites, databases etc. to the personal cache in the new MSC location. Thus, the location based information 510 continuously changes as a user moves from a location serviced by one MSC to a location serviced by a different MSC.

The user's profile 500 may also comprise rules that control time based information 515. The rules that control time based information 515 may comprise rules that when executed generate time based information, e.g., a list of clubs or restaurants that are open after a certain time, or a list of sales contacts that are to be contacted after a certain time etc.

The user's personal profile 500 may also contain rules that control context based information 520. The rules that control context based information 520 may include, e.g., rules that pertain to the transfer of information when a user moves from one geographic area to another e.g., the rules may specify that when the user is roaming, no graphics information is to be transferred to the user's wireless device 205.

In one embodiment of the invention, the transaction module 160 may form part of the personal cache 150 and may be copied from one cell to another.

Figure 3:
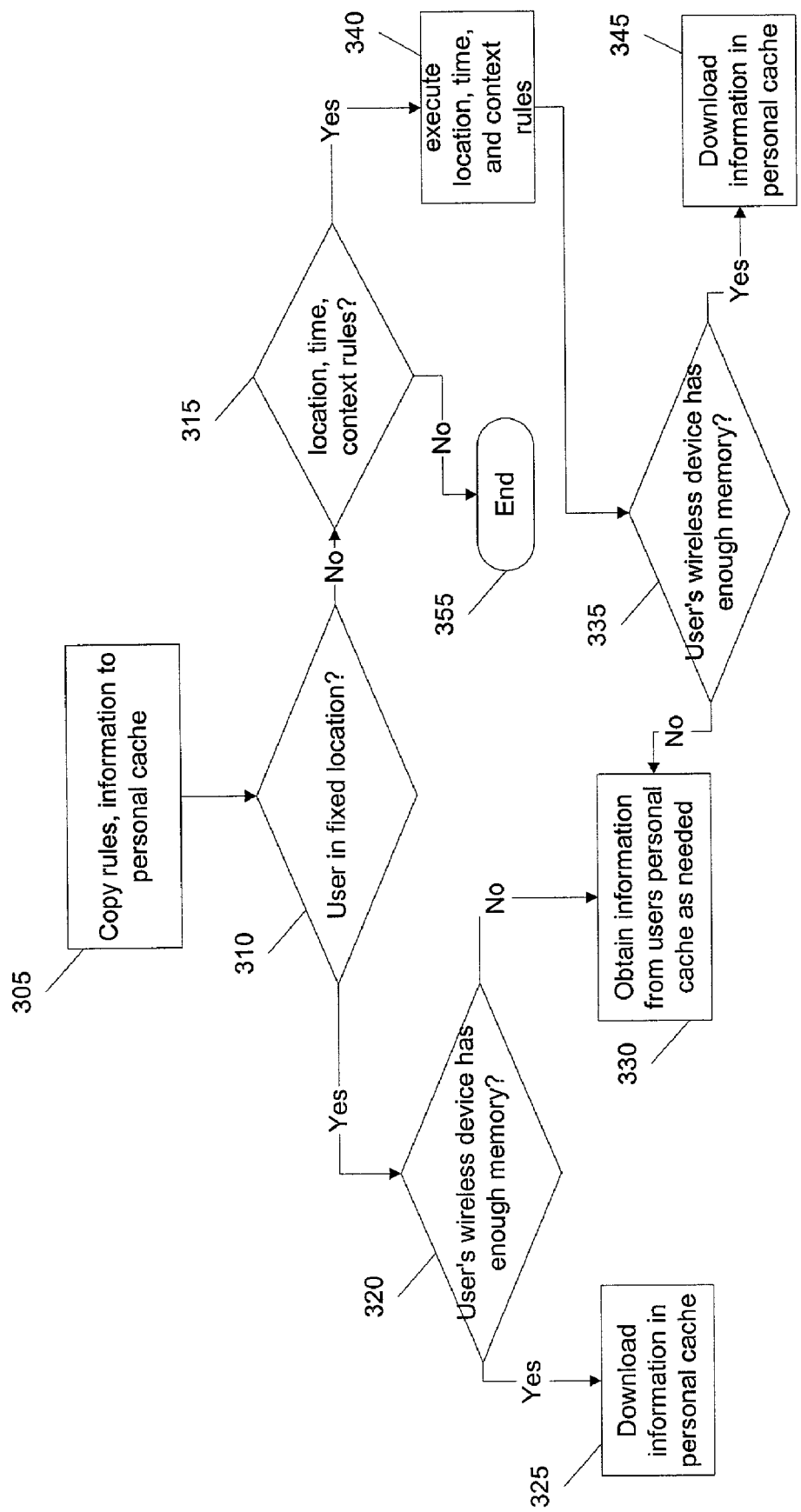
FIG. 3 illustrates a flow diagram illustrating a method to implement personal cache according to one embodiment of the invention.

FIG. 3 illustrates a flow diagram illustrating a method to implement personal cache according to one embodiment of the invention. At 305, information (e.g., text files, audio files, video files etc.) and rules that determine the parameters by which files are copied and stored in personal cache 250 are copied to a wireless cell 202. At 310 a determination is made by, e.g., MSC 215, whether a user, and in particular, wireless device 205 is within a certain cell location or whether the wireless device 205 moves from one cell location 200 to another cell location 202. If a particular cell 200 (or switching system within the cell) services the wireless device 205 for an extended period of time, indicating a non-mobile wireless device 205, at 320, a determination is made whether the wireless device 205 has sufficient memory to store all the information in the user's personal cache 250. If the wireless device 205 has sufficient memory, at 325, the information is downloaded to the wireless device 205. If the wireless device 205 does not have sufficient memory, at 330, the wireless device 205 obtains information from the personal cache 250 on an as needed basis. Thus, the information in the personal cache 250 is available to the wireless device 205, and is at the most one-hop away from the wireless device 205.

If at 310 a determination is made that the wireless device 205 has moved from one cell 205 to another cell 202, at 315, the information, including the rules, in the personal cache 250 in the old cell 200 (i.e., in the old switching system) may be copied to the new personal cache 265 in the new cell 202. In addition, a determination is made whether the rules contain user-specified generic information e.g., location, time, and context based information. If the rules contain location, time, and context based information then, at 340, the rules that contain the location, time, and context based information are executed and the information obtained by executing the rules are stored in new personal cache 265 and may be downloaded to the wireless device 205. Thus, the wireless device 205 has up to date information obtained as a result of executing the location, time and context based rules. However, if at 315 a determination is made that the rules do not contain location, time, and context based information, at 355 the process ends.

After executing the rules at 335, a determination is made whether the wireless device 205 has sufficient memory to store the information in the new personal cache 265. If the wireless device 205 has sufficient memory, then at 345, the information in the new personal cache 265 is downloaded to the wireless device 205. However, if the wireless device 205 does not have sufficient memory, the information is maintained in the new personal cache 265, and parts of the information may be downloaded to the wireless device 205 on an as-needed basis. In one embodiment, the wireless device 205 may have a buffer with a counter such that as information is streamed from the new personal cache 265, the counter is incremented and keeps track of the information in the wireless device's memory. As the information in the wireless device 205 is utilized (e.g., a song is played), the pointer is decremented. When the counter gets to a certain minimum value a signal is sent to the new personal cache 265 to download the next information set from the new personal cache 265 to wireless device 205. Thus, an uninterrupted flow of information may be realized at the wireless device.

Figure 4:
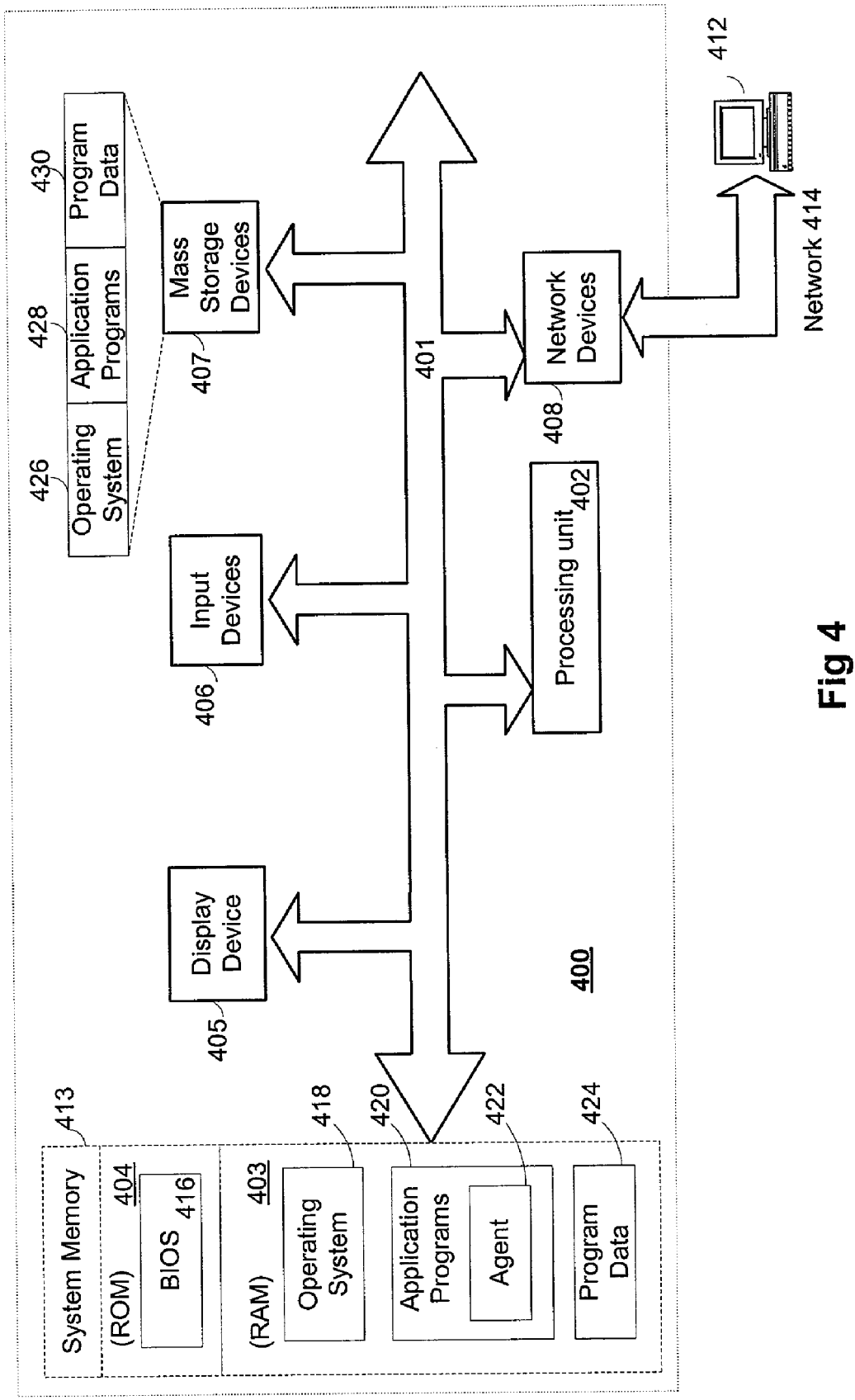
FIG. 4 illustrates an apparatus for using personal cache according to one embodiment of the invention.

FIG. 4 illustrates an apparatus for using personal cache according to one embodiment of the invention. FIG. 4 illustrates a wireless device 400 in which the present invention operates. The wireless device is used for accessing and using information in personal cache. One embodiment of the present invention is implemented using personal computer (PC) architecture. It will be apparent to those of ordinary skill in the art that alternative computer system architectures or other processor, programmable or electronic-based devices may also be employed.

In general, the wireless device illustrated by FIG. 4 includes a processing unit 402 coupled through a bus 401 to a system memory 413. System memory 413 comprises a read only memory (ROM) 404, and a random access memory (RAM) 403. ROM 404 comprises Basic Input Output System (BIOS) 416, and RAM 403 comprises operating system 403, application programs 420, agent 422, and program data 424. Agent 422 comprises the executable program that sends information to personal cache on the wireless network, generates and/or executes the rules for copying information to personal cache in a particular wireless cell or switching system, as well as manages the transfer of information in personal cache from one cell or switching system to another cell or switching system. In one embodiment of the invention, when the wireless device senses the movement of the wireless device from one cell to another cell (e.g., from one MSC to another) the rules that control the generation of information that is specific to a particular cell, i.e., location based information 510 are re-executed, and the information for the new cell is downloaded to RAM 403. The term cell as used herein is defined as an area that is serviced by a particular switching system or base station. Also, the rules that govern time based information 515 and context based information 520 may be executed by transaction module 160 and the results from executing these rules downloaded to RAM 403.

Wireless device 400 includes mass storage device 407, input devices 406 and display device 405 coupled to processing unit 402 via bus 401. Mass storage device 407 represents a persistent data storage device, such as a memory stick, or a fixed disk drive (e.g., magnetic, optical, magneto-optical, or the like). Mass storage device 407 stores program data 430 including the agent 430, application programs 428, and operating system 426. Processing unit 402 may be any of a wide variety of general purpose processors or microprocessors (such as the Pentium® processor manufactured by Intel® Corporation), a special purpose processor, or even a specifically programmed logic device.

Display device 405 provides graphical output for wireless device 400. Input devices 406 such as a keypad or mouse are coupled to bus 401 for communicating information and command selections to processor 402. Also coupled to processor 402 through bus 401 are one or more network devices 408 that can be used to control and transfer data to electronic devices (printers, other computers, etc.) connected to wireless device 400. Network devices 408 also connect wireless device 400 to a network, and may include Ethernet devices, phone jacks and satellite links. It will be apparent to one of ordinary skill in the art that other network devices such as wireless devices may also be utilized.

Embodiments of the invention (e.g., agent 422) may be represented as a software product stored on a machine-accessible medium (also referred to as a computer-accessible medium or a processor-accessible medium). The machine-accessible medium may be any type of magnetic, optical, or electrical storage medium including a diskette, CD-ROM, memory device (volatile or non-volatile), or similar storage mechanism. The machine-accessible medium may contain various sets of instructions, code sequences, configuration information, or other data to implement the method discussed with respect to FIG. 3. Those of ordinary skill in the art will appreciate that other instructions and operations necessary to implement the described invention may also be stored on the machine-accessible medium.

The machine-accessible medium comprises instructions that when executed by a machine causes the machine to perform operations comprising determining whether personal cache memory is available on a wireless network to store user-selected information, storing on the wireless network the user-selected information if the personal cache memory is available, and sending a copy of the user-selected information to a wireless device based on a set of rules.

Thus, a method and apparatus have been disclosed for using and managing personal cache. While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method comprising:
   determining whether cache memory is available on a wireless network to store at least one user-selected electronic file on the wireless network;
   storing on the wireless network the at least one user-selected electronic file if the cache memory is available; and
   sending a copy of the at least one user-selected electronic file to a wireless device;
   automatically copying the at least one user-selected electronic file in the cache memory from a location serviced by one switching center to a location serviced by another switching center as the wireless device moves from a location serviced by one switching center to a location serviced by another switching center;
   wherein the at least one user-selected electronic file is generated for a particular switching center serving area;
   wherein generating at least one user-selected electronic file for a particular switching center comprises:
   determining the location of the wireless device;
   accessing at least one of a web site and a database;
   searching the at least one of the web site and the database for location dependent information corresponding to the location of the wireless device; and ending the location dependent information to the wireless device;
   wherein the set of rules, automatically sends files to the wireless device when the wireless device moves from one location to another.

2. The method of claim 1 wherein determining whether cache memory is available on a wireless network to store at least one user-selected electronic file comprises determining whether the user subscribes to a wireless service that provides cache memory for storing the at least one user-selected electronic file.

3. The method of claim 1 wherein the at least one user-selected electronic file comprises at least one of an audio file, a video file, an audio-video file, an executable file, and a text file.

4. The method of claim 3 wherein determining whether cache memory is available to store the at least one user-selected electronic file comprises checking a user's profile stored in at least one of a home location register (HLR) and a visitor location register (VLR) to determine whether the user subscribes to a wireless service that provides cache memory for storing the at least one user-selected electronic file.

5. The method of claim 4 wherein storing on the wireless network the at least one user-selected electronic file if the cache memory is available comprises storing in the cache memory the at least one user-selected electronic file defined by the users profile.

6. The method of claim 5 wherein the copy of the at least one user-selected electronic file is sent to the wireless device automatically using wireless control channels.

7. An apparatus comprising:
   a checker module to determine whether cache memory is available on a wireless network to store at least one user-selected electronic file on the wireless network;
   a transaction module coupled with the checker module to store on the wireless network the at least one user-selected electronic file if the cache memory is available, the transaction module to send a copy of the at least one user-selected electronic file to a wireless device, and the transaction module also to automatically copy the at least one user-selected electronic file from a location serviced by one switching center to a location serviced by another switching center as the wireless device moves from a location serviced by one switching center to a location serviced by another switching center;
   wherein the transaction module generates the at least one user-selected electronic file for a particular switching center;
   wherein the transaction module to generate at least one user-selected electronic file for a particular switching center comprises the transaction module to determine the location of the wireless device, to access at least one of a web site and a database, to search the at least one of the web site and the database for location dependent information corresponding to the location of the wireless device, and to send the location dependent information to the wireless device.

8. The apparatus of claim 7 wherein the checker module to determine whether cache memory is available on a wireless network to store at least one user-selected electronic file comprises the checker module to determine whether the user subscribes to a wireless service that provides cache memory for storing the at least one user-selected electronic file.

9. The apparatus of claim 7 wherein the at least one user-selected electronic file comprises at least one of an audio file, a video file, a audio-video file, an executable file, and a text file.

10. The apparatus of claim 9 wherein the checker module to determine whether cache memory is available to store the at least one user-selected electronic file comprises the checker module to check the user's profile stored in at least one of a home location register (HLR) and a visitor location register (VLR) to determine whether the user subscribes to a wireless service that provides cache memory for storing the at least one user-selected electronic file.

11. The apparatus of claim 10 wherein the transaction module coupled with the checker module to store on the wireless network the at least one user-selected electronic file if the cache memory is available comprises the transaction module to store in the cache memory the at least one user-selected electronic file defined by the users profile.

12. The apparatus of claim 11 wherein the transaction module to send a copy of the at least one user-selected electronic file to a wireless device comprises the transaction module to send a copy of the at least one user-selected electronic file to a wireless device automatically using a wireless control channel.

13. An article of manufacture comprising:
a machine-accessible medium including instructions that, when executed by a machine, causes the machine to perform operations comprising:
determining whether cache memory is available on a wireless network to store at least one user-selected electronic file on the wireless network;
storing on the wireless network the at least one user-selected electronic file if the cache memory is available;
determining the location of a wireless device;
accessing at least one of a web site and a database;
searching the at least one of the web site and the database for location dependent information corresponding to the location of the wireless device;
sending the location dependent information to the wireless device; and
sending a copy of the at least one user-selected electronic file to the wireless device;
wherein instructions for sending a copy of the at least one user-selected electronic file to a wireless device comprises further instructions for automatically copying the at least one user-selected electronic file from a location serviced by one switching center to a location serviced by another switching center as the wireless device moves from a location serviced by one switching center to a location serviced by another switching center.

14. The article of manufacture as in claim 13, wherein instructions for determining whether cache memory is available on a wireless network to store at least one user-selected electronic file comprises further instructions for determining whether the user subscribes to a wireless service that provides cache memory for storing the at least one user-selected electronic file.

15. The article of manufacture as in claim 13, wherein instructions for determining whether cache memory is available to store the at least one user-selected electronic file comprises further instructions for checking a user's profile stored in at least one of a home location register (HLR) and a visitor location register (VLR) to determine whether the user subscribes to a wireless service that provides cache memory for storing the at least one user-selected electronic file.

16. The article of manufacture as in claim 13, wherein instructions for storing on the wireless network the at least one user-selected electronic file if the cache memory is available comprises further instructions for storing in the cache memory the at least one user-selected electronic file defined by the users profile.

17. The article of manufacture as in claim 13, wherein instructions for sending a copy of the at least one user-selected electronic file to a wireless device comprises further instructions for sending a copy of the at least one user-selected electronic file to the wireless device automatically using wireless control channels.

18. The article of manufacture as in claim 13, wherein instructions for sending a copy of the at least one user-selected electronic file to a wireless device comprises further instructions for generating the at least one electronic file.

* * * * *